(12) United States Patent
Zimmerman

(10) Patent No.: US 7,802,542 B1
(45) Date of Patent: Sep. 28, 2010

(54) DOG LEG PROTECTING APPARATUS

(76) Inventor: Audrey E. Zimmerman, 604-30 King Street East, Dundas, ON (CA) L9H 5G6

( * ) Notice: Subject to any disclaimer, the term of this patent is extended or adjusted under 35 U.S.C. 154(b) by 38 days.

(21) Appl. No.: 12/277,874

(22) Filed: Nov. 25, 2008

(51) Int. Cl.
*A01K 13/00* (2006.01)
(52) U.S. Cl. .................................... 119/850
(58) Field of Classification Search ............... 119/857, 119/865, 174, 850, 907, 856, 858; 54/79.1, 54/79.2, 79.4, 82
See application file for complete search history.

(56) References Cited

U.S. PATENT DOCUMENTS

| | | | | |
|---|---|---|---|---|
| 2,443,831 A | * | 6/1948 | Miller | 54/79.1 |
| 3,762,073 A | | 10/1973 | Cantales | |
| 4,744,333 A | * | 5/1988 | Taylor | 119/850 |
| 5,076,043 A | * | 12/1991 | Butler | 119/850 |
| 5,149,271 A | * | 9/1992 | Marvich | 434/295 |
| 5,271,211 A | * | 12/1993 | Newman | 54/79.2 |
| 5,408,812 A | | 4/1995 | Stark | |
| 5,426,925 A | * | 6/1995 | Smargiassi | 54/79.1 |
| 5,495,828 A | | 3/1996 | Solomon et al. | |
| 5,676,095 A | * | 10/1997 | Ralls | 119/850 |
| 6,138,611 A | * | 10/2000 | Thielemann | 119/850 |
| 6,186,097 B1 | | 2/2001 | Brockmann et al. | |
| 6,397,389 B1 | * | 6/2002 | Schultz | 2/69 |
| 6,508,205 B1 | | 1/2003 | Zink | |
| 6,694,924 B2 | * | 2/2004 | Clark | 119/850 |
| 6,786,028 B1 | * | 9/2004 | Longtin | 54/79.2 |
| 6,880,489 B2 | * | 4/2005 | Hartmann et al. | 119/856 |
| D516,256 S | | 2/2006 | Dymburt | |

* cited by examiner

Primary Examiner—Thomas Price

(57) ABSTRACT

A dog leg protecting apparatus includes a pair of flexible panels. Each of the panels includes a first side, a second side, a first edge, a second edge, an elongated third edge and an elongated fourth edge. Each panel has a pair of couplers attached thereto. The couplers allow each of the panels to be releasably secured into a pair of tubular members having the first and second edges forming foot openings of the tubular members. A securing assembly is attached to the panels and releasably secures together the panels. One of the panels is positionable over a front end of a dog and extended around front legs of the dog and one of the panels is positionable over a rear end of the dog extended around rear legs of the dog. The panels are attached together over a back of the dog.

8 Claims, 2 Drawing Sheets

DOG LEG PROTECTING APPARATUS

BACKGROUND OF THE INVENTION

Field of the Invention

The present invention relates to dog leg covering devices and more particularly pertains to a new dog leg covering device for protecting a canine's legs from cold weather and wet conditions.

SUMMARY OF THE INVENTION

The present invention meets the needs presented above by generally comprising a pair of flexible panels. Each of the panels includes a first side, a second side, a first edge, a second edge, a third edge and a fourth edge wherein the first and second edges are positioned opposite of each other. Each panel is elongated along its third and fourth edges. Each panel has a pair of couplers attached thereto. The first and second edges of each of the panels have one of the couplers positioned adjacent thereto. The couplers allow each of the panels to be releasably secured into a pair of tubular members having the first and second edges forming foot openings of the tubular members. A securing assembly is attached to the panels and releasably secures together the panels. One of the panels is positionable over a front end of a dog and extended around front legs of the dog and one of the panels is positionable over a rear end of the dog extended around rear legs of the dog. The panels are attached together over a back of the dog.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
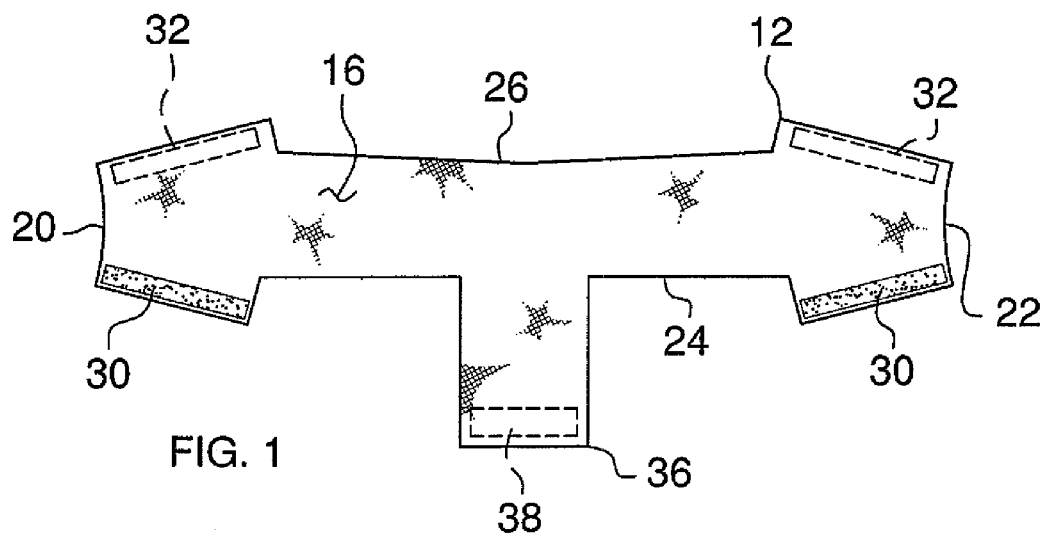
FIG. 1 is a top view of a first panel of a dog leg protecting apparatus according to the present invention.
Figure 2:
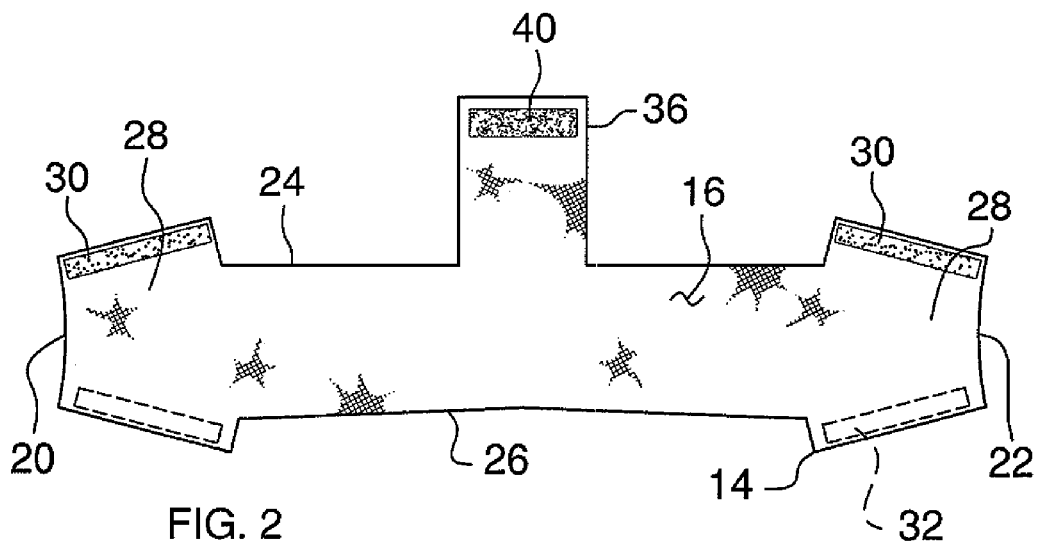
FIG. 2 is a top view of a second panel of the present invention.
Figure 3:
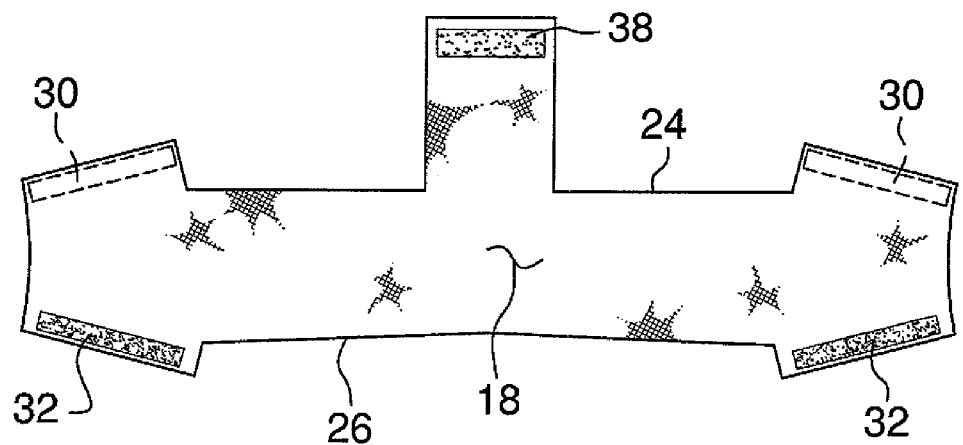
FIG. 3 is a bottom view of the first panel of the present invention.
Figure 4:
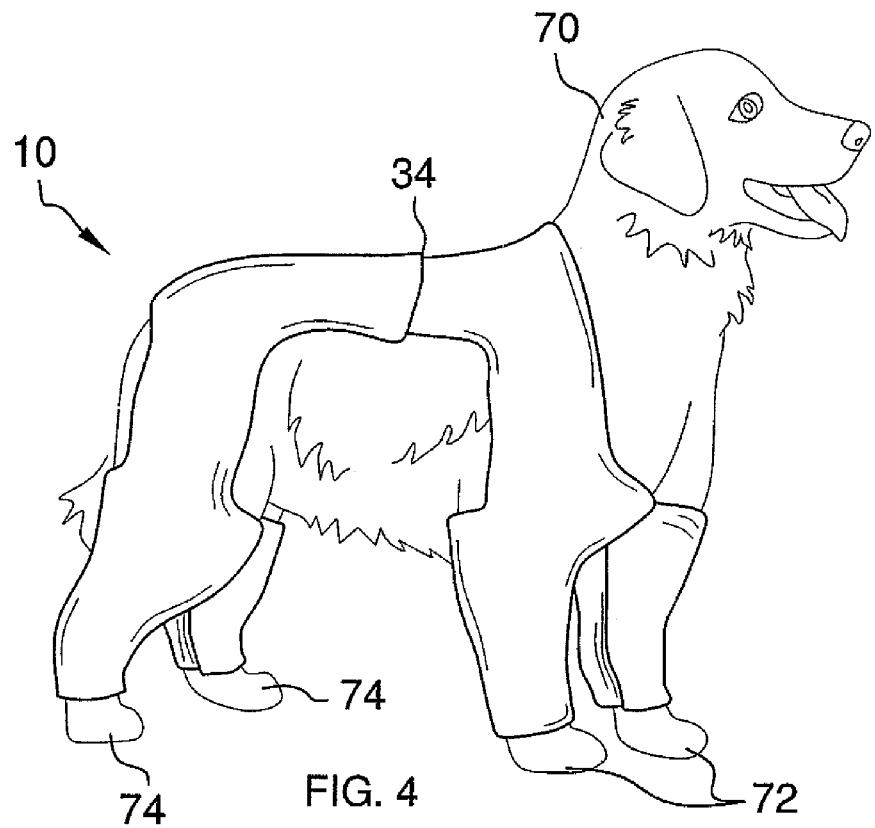
FIG. 4 is a perspective in-use view of the present invention.

With reference now to the drawings, and in particular to FIGS. 1 through 4 thereof, a new dog leg covering device embodying the principles and concepts of the present invention and generally designated by the reference numeral 10 will be described.

As best illustrated in FIGS. 1 through 4, the dog leg protecting apparatus 10 generally comprises a pair of flexible panels 12, 14. Each of the panels 12, 14 is comprised of a cloth fabric and includes a first side 16, a second side 18, a first edge 20, a second edge 22, a third edge 24 and a fourth edge 26 wherein the first 20 and second 22 edges are positioned opposite of each other. Each panel 12, 14 is elongated along the third 24 and fourth 26 edges and includes a pair of widened portions 28 extending between the third 24 and fourth 26 edges. The widened portions 28 are positioned adjacent to one of the first 20 and second 22 edges.

Each panel, of the pair of panels 12, 14, also includes a pair of couplers 30, 32 attached to the associated one of the panels 12, 14. Each of the first 20 and second 22 edges has one of the couplers 30, 32 positioned adjacent thereto. The couplers 30, 32 allow the selected panel 12, 14 to be releasably secured into a pair of tubular members having the first 20 and second 22 edges forming foot openings of the tubular members. Each of the couplers 30, 32 including a hook and loop closure including a first mating member 30 positioned along the third edge 24 and attached to the first side 16 and a second mating member 32 positioned along the fourth edge 26 and attached to the second side 18.

A securing assembly 34 is attached to the panels 12, 14 and releasably secures together the panels 12, 14. The securing assembly 34 includes a pair of flaps 36. Each of the panels 12, 14 has one of the flaps 36 attached thereto. The flaps 36 are spaced from the first 20 and second 22 edges of an associated one of the panels 12, 14. A fastening member 38, 40 releasably secures the flaps 36 together. The fastening member 38, 40 comprises a hook and loop closure including a first mating member 38 positioned on one of the flaps 36 and a second mating member 40 positioned on another one of the flaps 36.

In use, one of the panels 12 is positionable over a front end of a dog 70 and extended around front legs 72 of the dog 70 and one of the panels 12, 14 is positionable over a rear end of the dog extended around rear legs 74 of the dog 70. The widened portions 28 allow the panels 12, 14 to be wrapped around the dog's legs 72, 74. The panels 12, 14 are then attached together over a back of the dog 70. The panels 12, 14 keep the legs 72, 74 warm to prevent joint pain and the panels 12, 14 may also be comprised of a water resistant material to also shield the legs 72, 74 from rain and wet conditions.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dog leg covering apparatus positionable on and covering a dog's leg to protect the leg from cold weather, said apparatus comprising:

a pair of flexible panels, each of said panels including;

a first side, a second side, a first edge, a second edge, a third edge and a fourth edge wherein said first and second edges are positioned opposite of each other, said panel being elongated along said third and fourth edges;

a pair of couplers being attached to said panel, each of said first and second edges having one of said a couplers positioned adjacent thereto, said couplers allowing said panel to be releasably secured into a pair of tubular members having said first and second edges being foot openings of said tubular members;

a securing assembly being attached to said panels and releasably securing together said panels;

each of said couplers including a hook and loop closure including a first mating member positioned along said third edge and attached to said first side and a second mating member positioned along said fourth edge and attached to said second side; and wherein one of said panels is positionable over a front end of a dog and extended around front legs of the dog and one of said panels is positionable over a rear end of the dog extended around rear legs of the dog, and wherein said panels are attached together over a back of the dog.

2. The apparatus according to claim 1, wherein said panels each include a pair of widened portions extending between said third and fourth edges, each of said widened portions being positioned adjacent to one of said first and second edges.

3. The apparatus according to claim 1, wherein said securing assembly includes a pair of flaps, each of said panels having one of said flaps attached thereto, said flaps being spaced from said first and second edges of an associated one of said panels, a fastening member releasably securing said flaps together.

4. The apparatus according to claim 3, wherein said fastening member comprises a hook and loop closure including a first mating member positioned on one of said flaps and a second mating member positioned on another one of said flaps.

5. A dog leg covering apparatus positionable on and covering a dog's leg to protect the leg from cold weather, said apparatus comprising:

a pair of flexible panels, each of said panels including;

a first side, a second side, a first edge, a second edge, a third edge and a fourth edge wherein said first and second edges are positioned opposite of each other, said panel being elongated along said third and fourth edges, said panel including a pair of widened portions extending between said third and fourth edges, each of said widened portions being positioned adjacent to one of said first and second edges;

a pair of couplers being attached to said panel, each of said first and second edges having one of said a couplers positioned adjacent thereto, said couplers allowing said panel to be releasably secured into a pair of tubular members having said first and second edges being foot openings of said tubular members, each of said couplers including a hook and loop closure including a first mating member positioned along said third edge and attached to said first side and a second mating member positioned along said fourth edge and attached to said second side;

a securing assembly being attached to said panels and releasably securing together said panels, said securing assembly including a pair of flaps, each of said panels having one of said flaps attached thereto, said flaps being space from said first and second edges of an associated one of said panels, a fastening member releasably securing said flaps together, said fastening member comprising a hook and loop closure including a first mating member positioned on one of said flaps and a second mating member positioned on another one of said flaps; and wherein one of said panels is positionable over a front end of a dog and extended around front legs of the dog and one of said panels is positionable over a rear end of the dog extended around rear legs of the dog, and wherein said panels are attached together over a back of the dog.

6. A dog leg covering apparatus positionable on and covering a dog's leg to protect the leg from cold weather, said apparatus comprising:

a pair of flexible panels, each of said panels including;

a first side, a second side, a first edge, a second edge, a third edge and a fourth edge wherein said first and second edges are positioned opposite of each other, said panel being elongated along said third and fourth edges;

a pair of couplers being attached to said panel, each of said first and second edges having one of said a couplers positioned adjacent thereto, said couplers allowing said panel to be releasably secured into a pair of tubular members having said first and second edges being foot openings of said tubular members;

a securing assembly being attached to said panels and releasably securing together said panels, said securing assembly including a pair of flaps, each of said panels having one of said flaps attached thereto, said flaps being spaced from said first and second edges of an associated one of said panels, a fastening member releasably securing said flaps together; and wherein one of said panels is positionable over a front end of a dog and extended around front legs of the dog and one of said panels is positionable over a rear end of the dog extended around rear legs of the dog, and wherein said panels are attached together over a back of the dog.

7. The apparatus according to claim 6, wherein said panels each include a pair of widened portions extending between said third and fourth edges, each of said widened portions being positioned adjacent to one of said first and second edges.

8. The apparatus according to claim 6, wherein said fastening member comprises a hook and loop closure including a first mating member positioned on one of said flaps and a second mating member positioned on another one of said flaps.

* * * * *